United States Patent
Lam

(10) Patent No.: US 7,262,942 B2
(45) Date of Patent: Aug. 28, 2007

(54) LOW ARC AC CONTACTOR

(75) Inventor: Sheir Chun Lam, Kowloon (HK)

(73) Assignee: Fat Kwong TSE, Kowloon (HK)

( * ) Notice: Subject to any disclaimer, the term of this patent is extended or adjusted under 35 U.S.C. 154(b) by 434 days.

(21) Appl. No.: 11/011,429

(22) Filed: Dec. 15, 2004

(65) Prior Publication Data

US 2006/0061920 A1 Mar. 23, 2006

(30) Foreign Application Priority Data

Sep. 22, 2004 (CN) .................. 2004 1 0082645

(51) Int. Cl.
*H02H 3/00* (2006.01)
(52) U.S. Cl. ............................ 361/2; 361/42
(58) Field of Classification Search ............. 361/2, 361/42, 44
See application file for complete search history.

(56) References Cited

U.S. PATENT DOCUMENTS 4,847,725 A 7/1989 Ishii 5,170,309 A * 12/1992 Ishii et al. ................ 361/85
7,173,799 B1 * 2/2007 Weeks et al. ............. 361/42

FOREIGN PATENT DOCUMENTS

| CN | 89213805.X | 2/1990 |
| CN | 93221093.7 | 5/1994 |
| JP | 05-022840 | 1/1993 |
| JP | 05-334952 | 12/1993 |

* cited by examiner

Primary Examiner—Stephen W. Jackson
Assistant Examiner—Danny Nguyen
(74) Attorney, Agent, or Firm—Rabin & Berdo, P.C.

(57) ABSTRACT

A low arc AC contactor comprises an on/off mechanism electromagnetic-controlled contact, a pulse power source generating circuit, a low arc trigger generating circuit, and a multifunctional fault-detecting circuit. The contactor converts an instantaneous strong current into strong pulse magnetic field energy to actuate contacts of mechanical portion of the contactor, so that the power source load is on or off. Each of the actuating process will be controlled by the electric circuit to perform at the lowest potential of AC voltage for reducing arc's destructive power. Moreover, the contactor uses photoelectric coupling circuits, in which it can be controlled by external low voltage signal commands, as well as providing protection from overload, phase loss, short circuit, and leakage current.

14 Claims, 8 Drawing Sheets

LOW ARC AC CONTACTOR

BACKGROUND OF THE INVENTION

The present invention relates to an AC (Alternating Current) contactor and, more particularly, to an AC contactor in which, during the lowest potential of an AC source, its mechanical contacts are operated upon a large magnetic force converted from an instantaneous strong current in order to control the on or off of AC source load circuit and which may be controlled by external low voltage signal commands, thus providing safety protection from overload, phrase loss, short circuit, leakage current, etc.

DESCRIPTION OF RELATED ART

It is well known that commercially available conventional contactors are used for controlling the on or off of the power source load circuit, in which the mechanical contacts are operated upon a magnet field generated by the coil of contactor through that AC or DC flows. According to the requirements of the on-off procedure of the load circuit, as the mechanical contacts need to be in an engaging condition for a long time, the power for generating magnetic field must be continuously supplied to the coil for that period to retain the magnetic field, thus resulting in a higher consumption of power and bulky coil. Moreover, during the on-off procedure, the contacts of conventional contactor are engaged/disengaged in a random manner without a fixed schedule; hence during changing of engaging/disengaging condition, the contacts can be actuated at any point of the power cycle. However, as the load current is high or a short circuit occurs, a powerful arc will be generated so that the contacts are burn out or the life span thereof is shorten. Therefore, conventional contactor is generally equipped with metal or ceramic components as a heat sink and arc-suppression device, with the result that such the contactor are complex and bulky in structure. Furthermore, the commercially available conventional contactor merely has single purpose of engaging/disengaging the load circuit, and it must be cooperated with various electrical safety devices for protections from leakage current, overload or phase loss etc., so it would be inconvenient to handle. Finally, commercially available conventional contactor cannot be controlled directly by external signals with low voltages and small currents and it must be used with peripheral auxiliary devices in certain situation.

SUMMARY OF THE INVENTION

To sum up, the present invention is directed at overcoming the technical problems of the conventional contactor, for example, higher power consumption, strongly arcing at changing of engaging/disengaging condition, single purpose and unavailable direct control by an external low voltage and small current signal.

It is therefore an object of the present invention to provide a low arc AC contactor that can be controlled directly by an external low voltage and small current signal command.

It is another object of the present invention to provide a contactor, which utilizes a pulse magnetic field to control engaging/disengaging condition of contacts of the contactor.

It is a further object of the present invention to provide a multifunctional contactor, by which various circuit faults may be detected.

The technical scheme of the present invention is as follows:

With accordance to the present invention, a low arc AC contactor comprises an on/off mechanism of electromagnetic-controlled contacts having coils L1 and L2 for converting electric energy into magnetic energy, whereby allowing the contacts to be in engaging or disengaging condition, characterized in that said contactor further comprises:

a pulse power source generating circuit in which its input is connected to R and T terminals for providing two pulse power sources, and both are controllably connected to coil L1 and coil L2 respectively; and a low arc trigger generating circuit in which a pulse DC (direct current) voltage signal generated by said pulse power source generating circuit is received in order to establish time coordinate signal of lowest potential in an AC power source cycle, and an external triggered on/off controlling command is received to provide with on-command trigger pulse to said pulse power source generating circuit so that a strong pulse magnetic field is generated in coil L1, thus resulting in the contacts being in engaging condition, as well as to provide with off-command trigger pulse or an power outage auto-cutout trigger pulse to said pulse power source generating circuit so that a strong pulse magnetic field is generated in coil L2, thus resulting in the contacts being in disengaging condition.

Moreover, the low arc AC contactor further comprises a multifunctional fault-detecting circuit, which is connected to the on/off mechanism of electromagnetic-controlled contacts-and by which a short circuit current pulse detecting signal or an overload current pulse detecting signal is transmitted to said low arc trigger generating circuit in order to output off-command trigger pulse, thus generating a strong pulse magnetic field in the coil L2 and allowing the contacts to be in disengaging condition.

Furthermore, said pulse power source generating circuit comprises a pulse DC voltage generating unit, a charging switch unit, a pulse power storage unit for onstate, and a pulse power storage unit for offstate to form a charging loop successively as well as an onstate discharging switch unit and an offstate discharging switch unit connected to the pulse power storage unit for onstate and the pulse power storage unit for offstate to form a discharging loop by electrically connects to coil L1 or coil L2 respectively.

The aforesaid low arc trigger generating circuit comprises:

a zero potential coordinate signal generating unit, by which a pulse DC voltage signal from said pulse power source generating circuit is received and to which a power outage auto-cutout triggering unit is connected;

a photoelectric coupling on-command input unit, a on-command detecting unit and a on-command trigger unit to form a circuit successively and in which the on-command detecting unit is also controlled by a time coordinate signal of the lowest potential in AC power source cycle from zero potential coordinate generating unit, and a photoelectric coupling off-command input unit, a off-command detecting unit and a off-command trigger unit to form a circuit successively and in which the turn off command detecting unit is also controlled by a time coordinate signal of the lowest potential in AC power source cycle transmitted from zero potential coordinate generating unit.

The said photoelectric coupling on-command input unit comprises a photoelectric coupling circuit PT1 by which the ground terminal of the circuits of on-command trigger units is isolated from the ground terminal of said contactor.

The input of the photoelectric coupling circuit PT1 is connected to on-command input unit comprising a command key S1;

The photoelectric coupling off-command input unit comprises a photoelectric coupling circuit PT2 by which the ground terminal of the circuits of off-command units is isolated from the ground terminal of said contactor.

The input of the photoelectric coupling circuit PT2 is connected to off-command input unit comprising a command key S2;

The multifunctional fault-detecting circuit includes a multifunctional fault-detecting unit, a short circuit current pulse detecting unit, and a short circuit signal coordinate signal generating unit, as well as an overload current pulse detecting unit connected to the multifunctional fault-detecting unit, wherein said short circuit signal coordinate signal generating unit and overload current pulse detecting unit input off-command signal to the low arc trigger generating circuit respectively;

The multifunctional fault-detecting circuit is a fault-detecting device comprising plurality of mutual inductors capable of detecting short circuit, overload, leakage current, phase loss and imbalanced power, and The on/off mechanism electromagnetic-controlled contact is a mechanical self-locking one or a polarized magnetic field self-locking one.

The present invention has advantages as follows:

1. The multifunctional low arc contactor of the present invention is able to lay previously current in a capacitor in store for generating a pulse current by electronic circuit, so that when the pulse current passes through the coil of the contactor a strong pulse magnetic field is induced and by means of which its mechanical contacts are engaged together. At the same time, such a engaging condition is kept by using the mechanical self-locking method (see FIG. 1, 10A) or polarized magnetic field self-locking method. When the contacts need to be disengaged, the self-locking is released in the same manner as the above, i.e., by means of current stored in the capacitor. Therefore the contactor has low power consumption, compact size, and high in safe factor. Since the pulse current is applied to the coils, the contactor coils generally are at rest without consuming current and producing heat; therefore, it can be extremely small. The power consumption of the present contactor is only one-tenth of conventional contactor.

2. The multifunctional low arc contactor of the present invention utilizes electronic circuit for calculation, so that engaging/disengaging process is controlled to proceed at the lowest potential of AC voltage. As a result, the harmful effects of arcing on contacts are minimized; therefore, the contactor is compact in size and high efficiency without using expensive arc-suppression device.

3. The multifunctional low arc contactor of the present invention utilizes photoelectric coupling circuit, which can be directly controlled by external signal command; hence it is simple, and convenient.

4. The multifunctional low arc contactor of the present invention is equipped with a power safety protection device, by which the contacts of the contactor can be instantaneously disengaged when faulty occurs in the circuit load, including overload, leakage current, phase loss, short circuit, imbalance power or electric shock, etc.

BRIEF DESCRIPTION OF THE DRAWINGS

These and other objects as well as advantages of the present invention will become clear by the following description with reference to the accompanying drawings, in which.

DETAILED DESCRIPTION OF THE PREFERRED EMBODIMENT

An embodiment of a multifunctional low arc AC contactor of the present invention is illustrated in FIGS. 1-7.

Figure 1:
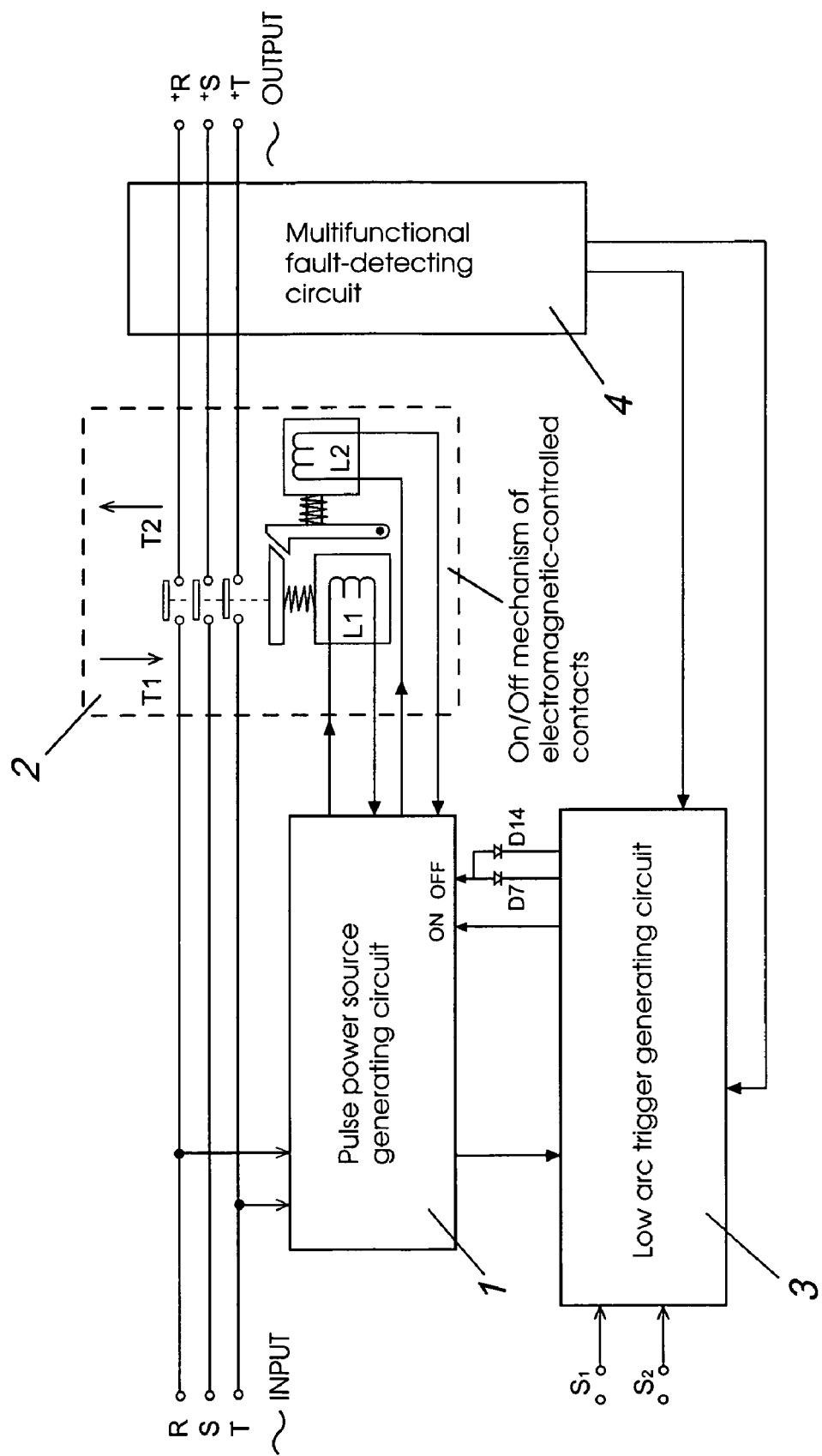
FIG. 1 is a block diagram of the entire mechanism of the present invention.
Figure 2:
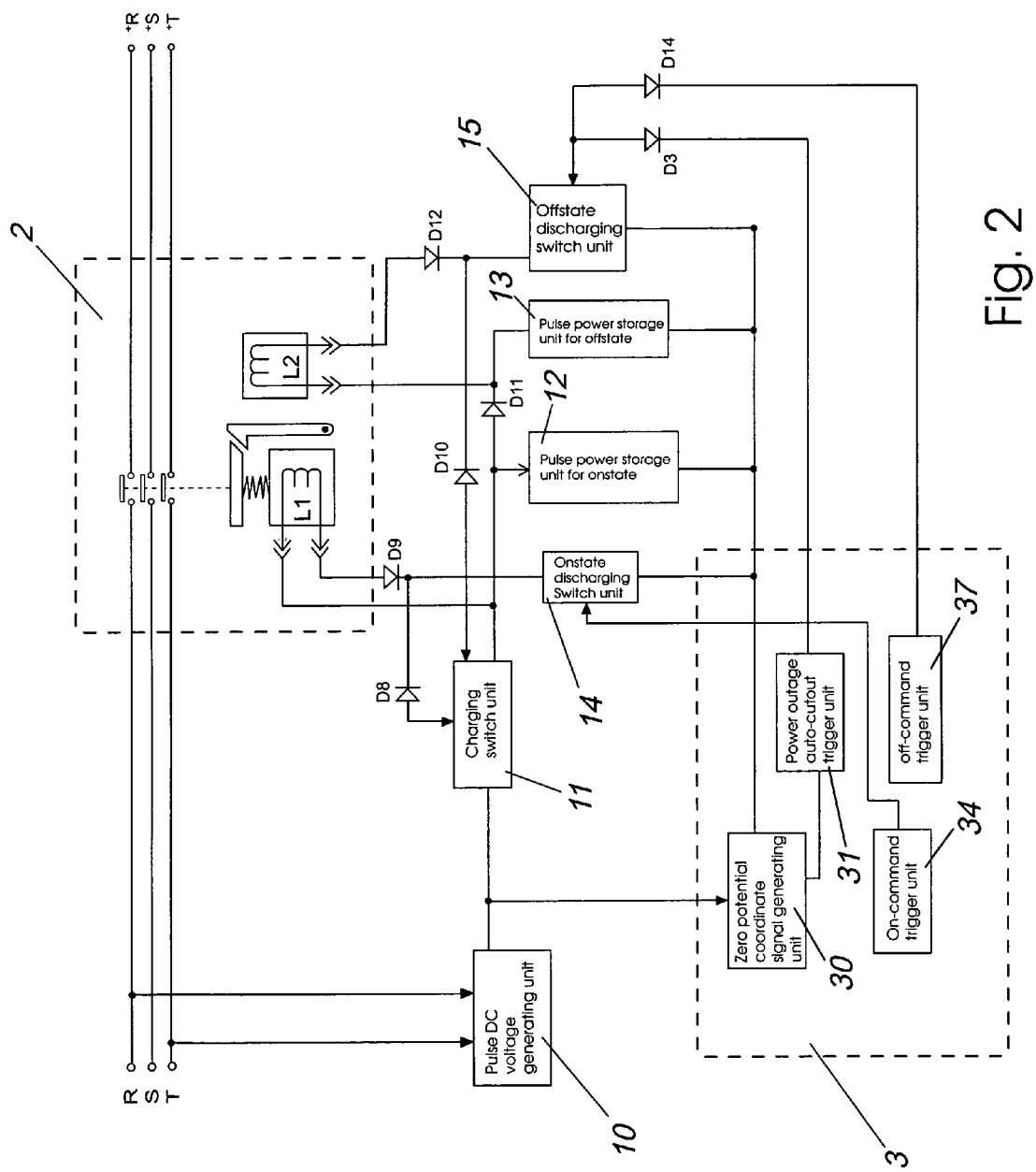
FIG. 2 is a block diagram of a pulse power source generating circuit of the present invention.
Figure 3:
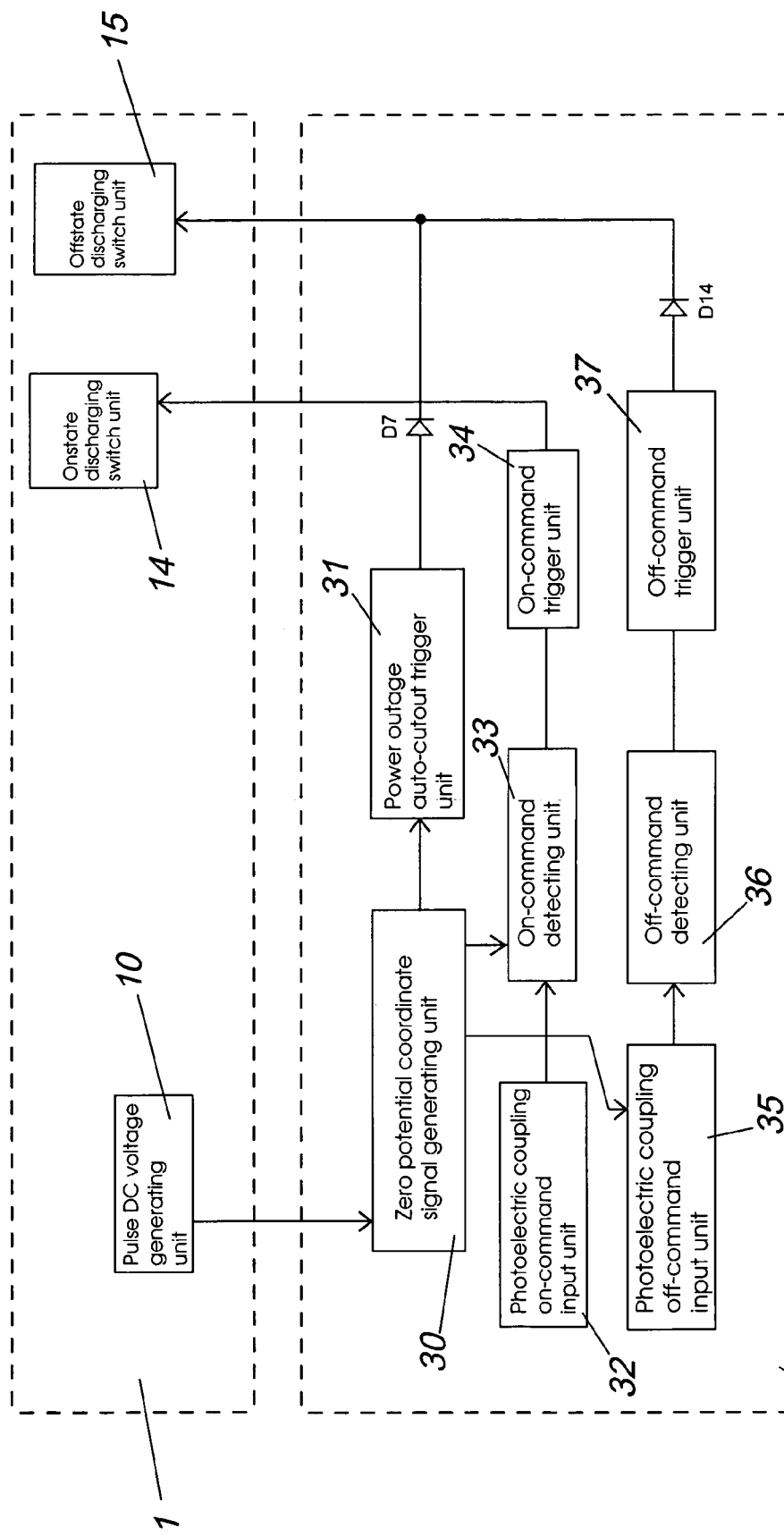
FIG. 3 is a block diagram of a low arc trigger generating circuit of the present invention.
Figure 4:
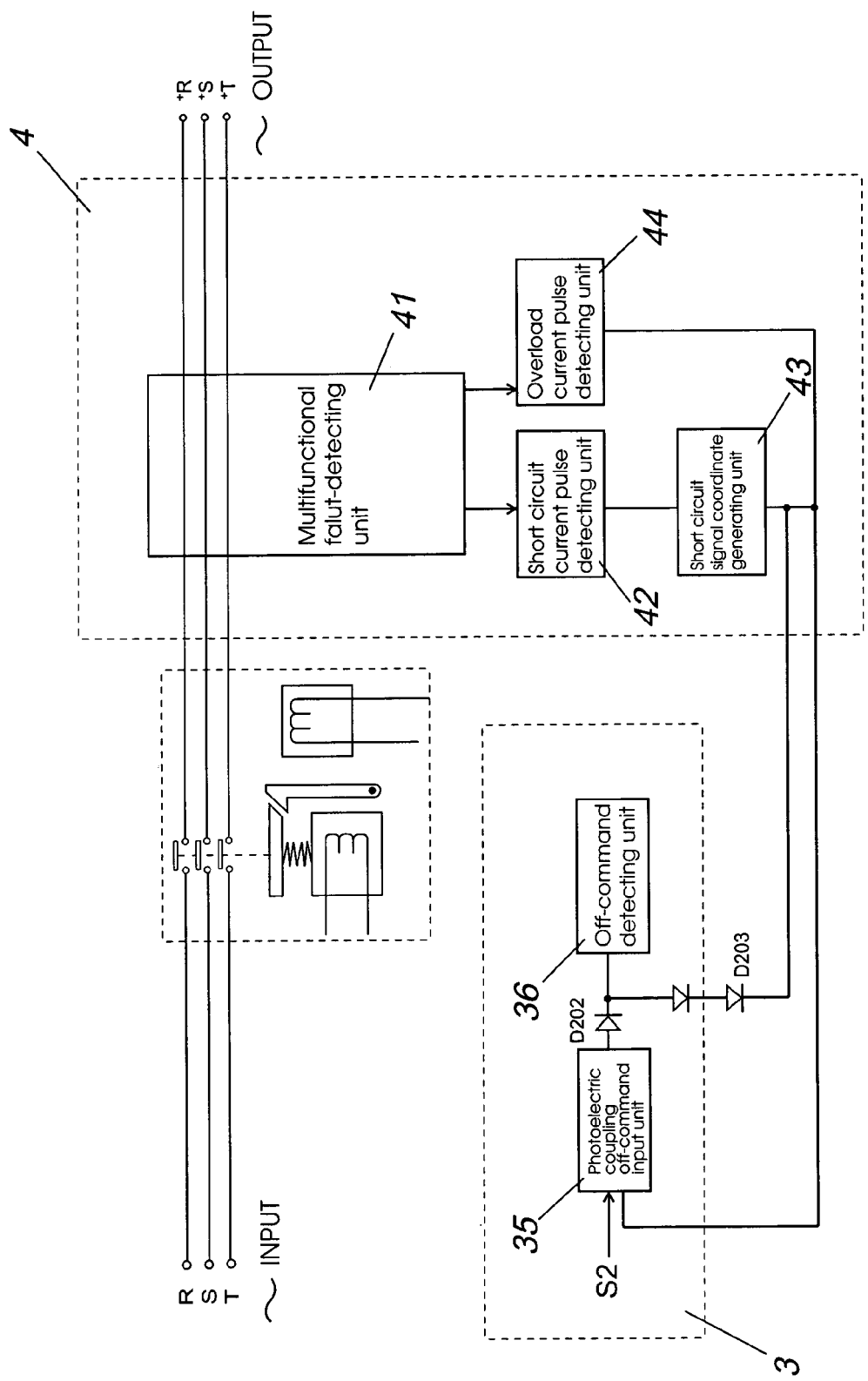
FIG. 4 is a block diagram of a multifunctional fault-detecting circuit of the present invention.

Referring now to FIG. 1, FIG. 2 and FIG. 3, the low arc AC contactor of the present invention includes a mechanism 2 for engaging/disengaging electromagnetic-controlled contacts, wherein the contacts are connected to AC power supply and the load; a pulse power source generating circuit 1, which is two-way electrically connected with coil L1 and a coil L2 in the on/off mechanism 2 of the electromagnetic-controlled contacts; as well as low arc trigger generating circuit 3, by which a pulse DC signal from the pulse power source generating circuit 1 is received the lowest potential of the AC voltage is detected, and an on-command low arc triggering signal is transmitted to the pulse power source generating circuit 1 in order to generate strong current to induce strong pulse magnetic field in coil L1, thus engaging the contacts, and an off-command low arc triggering signal or outage auto-cutout triggering signal is transmitted in order to generate strong current to induce strong pulse magnetic field in coil L2, thus disengaging the contacts. Furthermore, the present invention also includes a multifunctional fault-detecting circuit 4 connected to the mechanism 2 for engaging/disengaging electromagnetic-controlled contacts, as shown in FIGS. 1 and 4, by which a short circuit pulse current signal when short circuit is detected or overload pulse current signal when other faults such as overload, leakage current, phase loss or imbalanced power is provided to the low arc trigger generating circuit 3 as an off-command or signal in order to generate strong pulse magnetic field in coil L2, thus disengaging the contacts.

Referring now to FIG. 2, the pulse power source generating circuit 1 includes a pulse DC voltage generating unit 10, charging switch unit 11, a pulse power storage unit 12 for onstate, and a pulse power storage unit 13 for offstate, as well as an onstate discharging switch unit 14 and an offstate discharging switch unit 15 connected respectively with said pulse power storage unit 12 for onstate and pulse power storage unit 13 for offstate.

Figure 5:
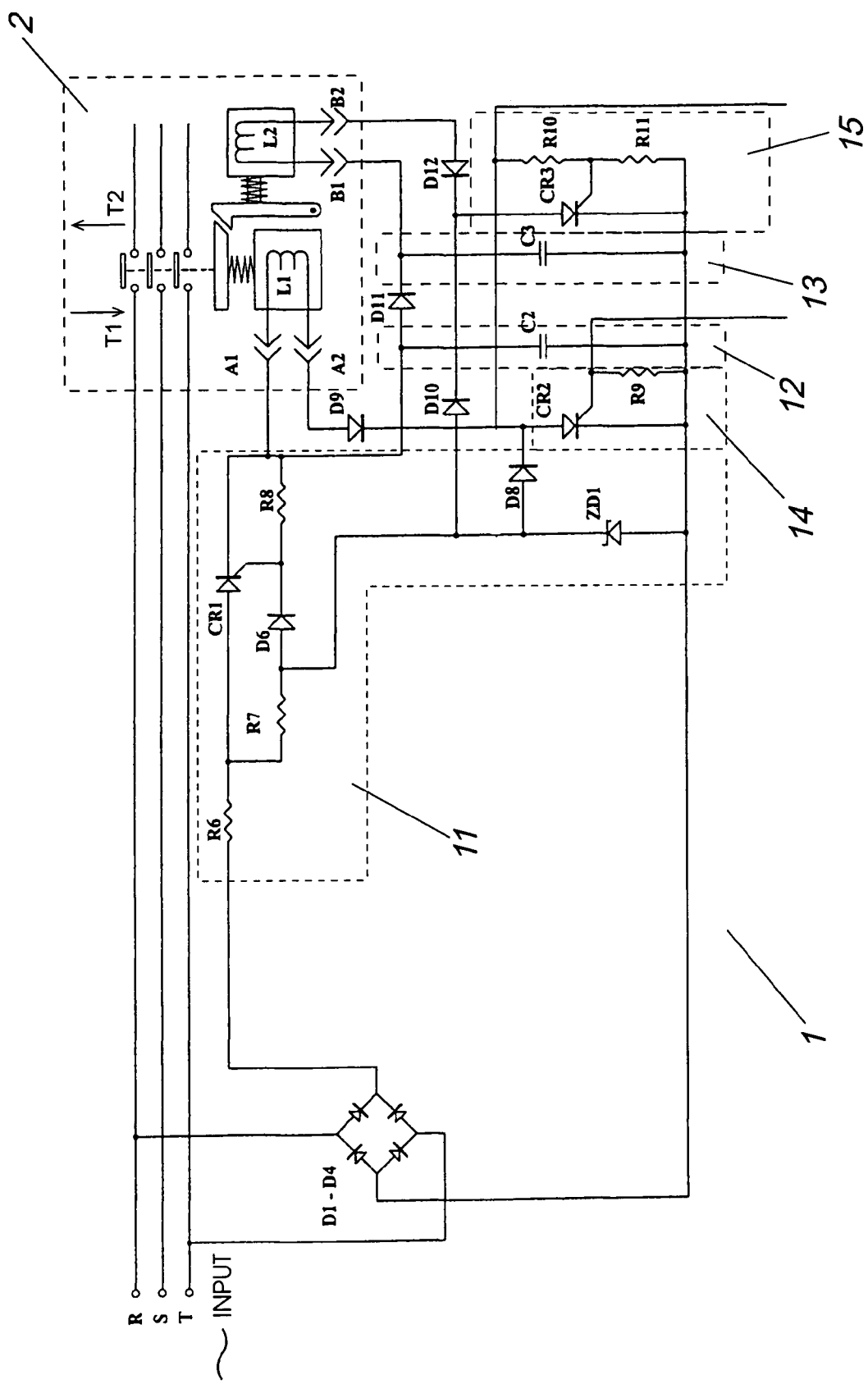
FIG. 5 is an embodiment of a pulse power source generating circuit and a mechanism for engaging/disengaging electromagnetic-controlled contacts of the present invention.

Referring now to FIG. 5, the pulse DC voltage generating unit 10 consists of a full bridge rectifier formed by four rectifier diodes D1-D4, in which it is connected with the terminals R. T of the AC power source, thus generating a pulse DC voltage, and the current flows through resistors R6, R7, a bias current keeping diode D6 and a resistor R8 to trigger switching diode CR1 on. The current flows through the switching diode CR1 for charging up capacitors C2, C3 until potential across the capacitors C2, C3 is higher than that of the limitation Zener diode ZD1, where by make the diode D6 reverse-biased and the switching diode CR1 turnoff. When a trigger switching diode CR2 receives a trigger pulse from an on-command trigger unit 34 in the low arc trigger generating circuit 3, an instantaneous strong current from the capacitor C2 flows through coil L1 and diode D9 to discharge to trigger switching diode CR2, thus instantaneously generating a strong pulse magnetic field in coil L1. By means of such strong magnetic field, the contacts of the electromagnetic-controlled on/off mechanism 2 of the contactor of the present invention are engaged together. Since trigger switching diode CR2 is on, trigger voltage of the trigger switching diode CR1, through the diode D8, makes trigger switching diode CR2 short-circuited. As a result, the switching diode CR1 stops working until the capacitor C2 finishes discharging and trigger switching diode CR2 has no current to maintain its operation. Similarly, when trigger switching diode CR3 is triggered by off-command signal voltage from the operational amplifiers OA2 and OA9 in the low arc trigger generating circuit 3 through OR gates D7, D14 respectively, an instantaneous strong current from the capacitor C3 flows through coil L2 and diode D12 for discharging to trigger switching diode CR3, thus generating strong pulse magnetic field in coil L2 and then releasing the self-locking mechanism from the electromagnetic-controlled on/off mechanism 2 of the contactor. In the embodiment, the electromagnetic-controlled contacts utilizes a mechanical self-locking or releasing. While a pulse current flows through coil L1 and an instantaneous strong magnetic field is induced, the contacts of mechanical portion are engaged and such an engaging condition is kept in a mechanism self-locking manner. When a pulse current flows through coil L2 and an instantaneous strong magnetic field is induced, the self-locking mechanism is attracted and contacts are disengaged. This configuration is characterized as follows:

1. Coils L1, L2 have no current consumption except that the pulse current there through during startup.

2. The pulse current in coils L1, L2 during startup is ten times higher than the operating current of the conventional contactor.

To sum up, the pulse DC voltage generating unit 10 is a full bridge rectifier consisting of D1-D4.

The charging switch unit 11 includes a trigger switching diode CR1 and a current limiting resistor R6 being in series therewith as well as a resistor R7, a bias current keeping diode D6, a resistor R8, a limiting Zener diode ZD1 and diodes D8, D10.

The pulse power storage unit 12 for onstate is a capacitor C2 and the pulse power storage unit 13 for offstate is a capacitor C3, between both a separating diode D11 is provided.

The onstate discharging switch unit 14 includes a diode D9 and a trigger switching diode CR2 being in series connection, and voltage divider resistors R9 and R13 connected to trigger pole of switching diode CR2. The offstate discharging switch unit 15 includes a diode D12 and a trigger switching diode CR3 being in series connection, and voltage divider resistors R10 and R11 connected to trigger pole of switching diode CR3 as well as diodes D7, D14 consisting of OR gates.

Figure 6:
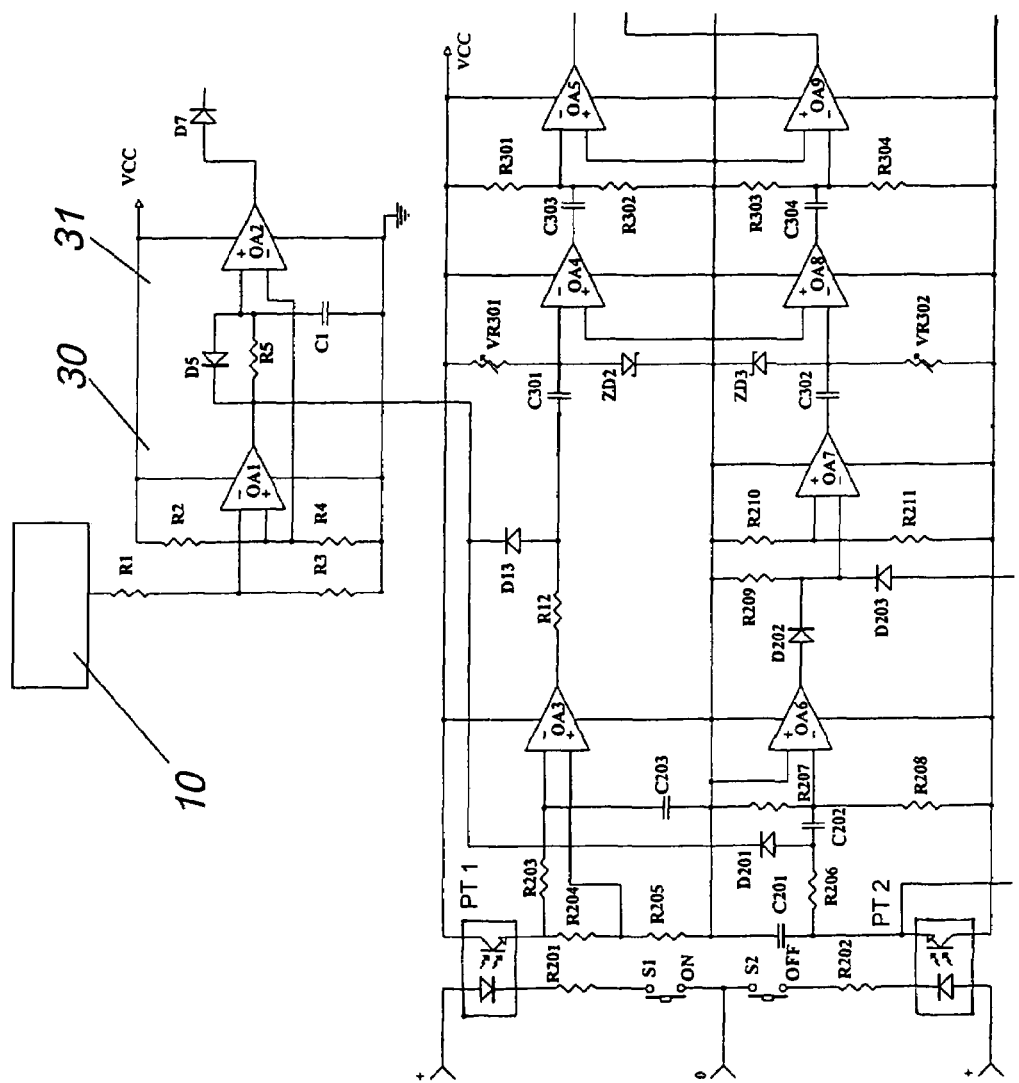
FIG. 6 is an embodiment of a low arc trigger generating circuit of the present invention.

Referring now to FIG. 3 and FIG. 6, as shown in FIG. 3, the low arc trigger generating circuit 3 of the present invention includes the above mentioned pulse DC voltage generating circuit 10, and a zero potential coordinate signal generating unit 30 and an outage auto-cutout trigger unit 31 to form a circuit in turn; and A photoelectric coupling on-command input unit 32, a on-command detecting unit 33 and a on-command trigger unit 34 to form a circuit in turn, wherein said on-command detecting unit 33 receives a zero potential detecting signal from the zero potential coordinate signal generating unit 30; as well as A photoelectric coupling off-command input unit 35, a off-command detecting unit 36 and a off-command trigger unit 37 to form a circuit in turn, wherein said photoelectric coupling off-command detecting unit 35 receives a zero potential detecting signal from the zero potential coordinate signal generating unit 30.

Referring now to FIG. 6, wherein voltage comparator OA1 and OA2 formed a zero potential coordinates generating unit 30 and a outage auto-cutout trigger unit 31 consist of voltage comparators OA1 and OA2 respectively, two objectives of which are as follows: the first objective is to control the discharging/charging of D13, C301, D201, and D202 constantly at zero potential of the input source and the second one is to turn trigger switching diode CR3 on by allowing OA2 to output a high potential signal, when the input AC source is outage, thus disengaging the contacts of mechanic portion of the contactor.

The voltage comparator OA1 compares the power source voltages value of the terminals of the divider resistors R1, R3 at the entrance of pulse DC voltage generating unit 10 with a predetermined voltage value of resistor R4. When the terminal voltage value of R3 is lower than that of R4, OA1 outputs a high potential, so that C202 in the photoelectric coupling off-command input unit 35 and C301 in the on-command detecting unit 33 are ready to be charged until the terminal voltage value of R3 is higher than that of R4, and then the output of OA1 changes to a low potential, so that the diodes D5, D13, D201 are connected to the ground. As a result, the voltage and current stored in C202, C301 and C1 are quickly discharged to the said diodes to produce a time coordinate signal for the on-command detecting unit 33. Secondly, since the C1 is slowly charged and quickly discharged, the usual voltage value of the C1 terminals is greatly lower than that of the R4 terminals. Output of OA2 is in a status of low potential, when the input power is suddenly interrupted, the voltage value of R4 terminals is higher than that of R3 terminals for extended period, and OA1 output a high potential to charge the C1 until the voltage value of C1 terminals is higher that of the R4 terminals. Then, the outputs of OA2 changes to a high potential, thus making the trigger switching diode CR3 through the OR gate diode D7 turned on, and disengaging the contacts of the mechanical portion.

The objective of installing a photoelectric coupling on-command input unit 32 and a photoelectric coupling off-command input unit 35 is to isolate the ground terminal of the command input units (32,35) from the ground terminal of contactor circuit, and to be directly controlled by an external signal voltage command.

When a commend key S1 is pressed, PT1 is turned on. OA3 outputs a high potential through R12 and charges up C301 once OA1 outputs a high potential, until the potential output of OA1 becomes low, C301 discharges to OA1 through D13, thus triggering on-command detecting unit 33 to operate.

When an off-command key S2 is pressed, PT2 is turned on and outputs a high potential through R206 and charges up C202 once OA1 outputs a high potential, until the potential output of OA1 becomes low, C202 discharges to OA1 through D201, thus changing the output status of OA6, OA7, and making off-command contactor unit 37 operated.

The operating of the low arc trigger generating circuit 3 is independent from input time of the "ON" signal so that the discharging/charging of C301 and C302 in the circuit is always at zero potential which delaying the signal appropriately that associates with the engaging action time (T1) of the contacts for turning the trigger switching diode CR2 on and engaging the contacts at the position of lowest potential of input voltage, such as to minimize the harmful effects of arcing.

Before "ON" signal is input, C301 will only be charged by means of voltage through the R12 at the time that OA1's output potential changes from low to high, until OA1 output potential changes from high to low again. Once C301 discharges, OA4 output potential changes from low to high to charge up C303 until the C301 finishes discharging in which the discharging time depends on values of C301 and VR301. When OA4 backs to the low potential, C303 discharges into OA4, thus allowing OA5 to output a high potential and making trigger switching diode CR2 turned on.

The working principle of OA8 and OA9 of the off-command trigger unit 37 is the same as that of OA4 and OA5 of the on-command trigger unit 34.

To sum up, in FIG. 6, the zero potential coordinate signal generating unit 30 is a voltage comparator connected to a rectifier output terminals of the pulse DC voltage unit 10, which includes a operational amplifier OA1 and divider resistors R1, R3 connected to the input end thereof, and R2, R4 and an integrating circuit R5C1 and a limiter diode D5. The outage auto-cutout trigger unit 31 is a voltage comparator OA2 connected to the zero potential coordinate signal generating unit 30.

The photoelectric coupling on-command input unit 32 includes a photoelectric coupling on-command circuit PT1, an on-command key S1, a resistor R201, and independent resistors R204, R205, and an operational amplifier OA3 connected thereto through resistor R203 and capacitor C203.

The on-command detecting unit 33 includes an operational amplifier OA4, a resistor R12 connected to the output end of OA3 and the input "−" end of OA4, a capacitor 301, an Zener diode ZD2 connected to "−" end of OA and a current limiting potentiometer VR301, as well as a diode D13 connecting to a common node of R12, C301 and output end of OA1.

The on-command trigger unit 34 includes an operational amplifier OA5, wherein "+" end of which is grounded, and the input "−" end of which is connected to the divider resistors R301, R302, as well as at the point of voltage division, a capacitor C303 is connected to the output end of OA4.

The photoelectric coupling off-command input unit 35 includes a photoelectric coupling on-command circuit PT2, a off-command key S2 and a resistor R202 connected to the input terminal of PT2, as well as an output high-frequency filter capacitor C201 and an isolating resistor R206.

The off-command detecting unit 36 includes an operational amplifier OA6, divider resistors R207, R208 and input coupling capacitor C201 connected to "−" input end of OA6, and a diode D201 connected to C201 and output terminal of OA1.

The off-command trigger unit 37 includes operational amplifiers OA7, OA8, OA9, divider resistors R210, R211 connected to "+" input end of OA7, a resistor R209 and two input OR gate diodes D202, D203 connected to "−" input end of OA7; voltage regulation units VR302, ZD3 and coupling capacitor C302 connected to "−" input end of OA8; divider resistors R303, R304 and coupling capacitor C304 connected to the "−" input end of OA9, and the "+" input end of OA8 and OA9 are grounded.

Figure 7:
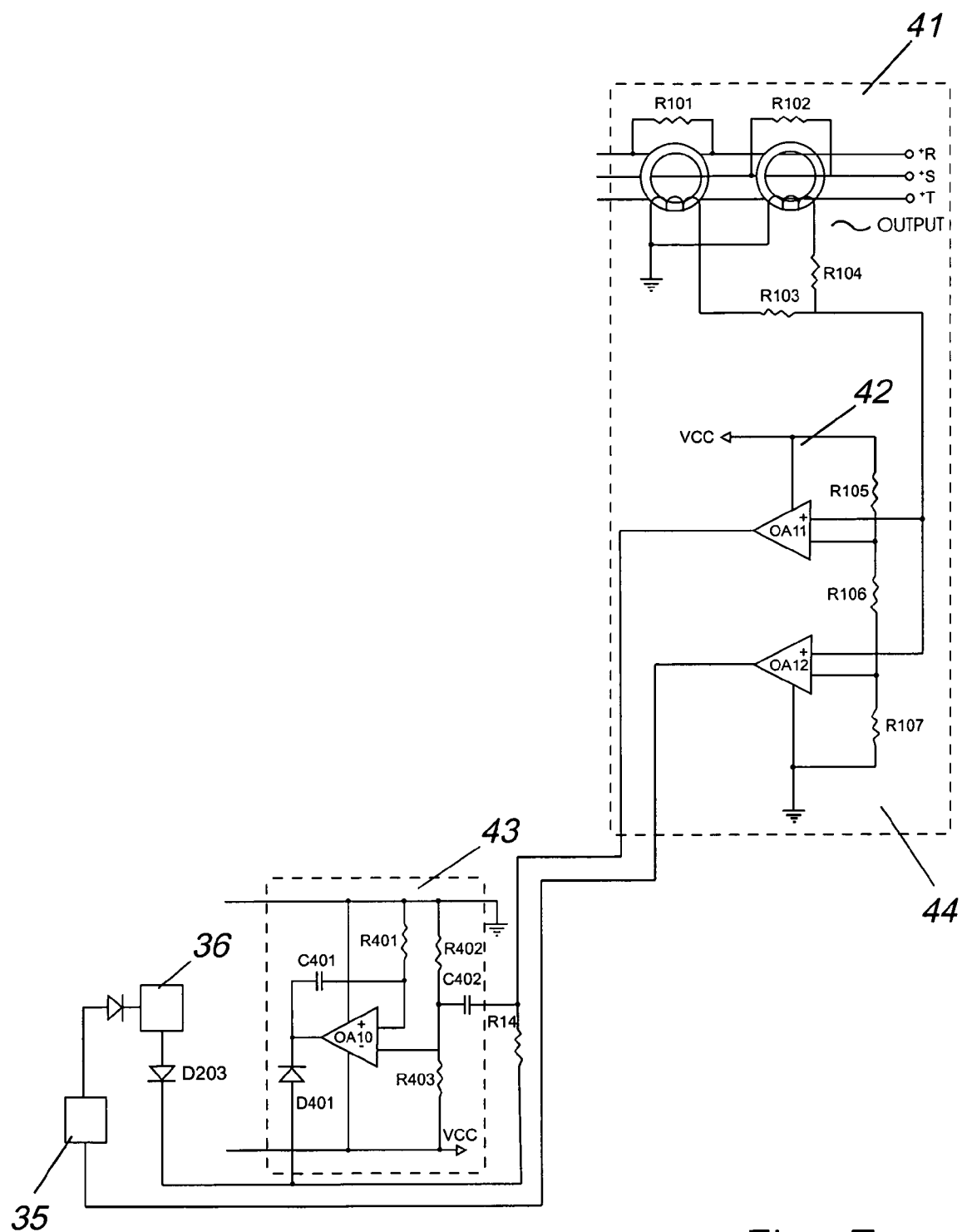
FIG. 7 is an embodiment of the multifunctional fault-detecting circuit of the present invention.

Referring now to FIGS. 1, 4 and 7, since the electromagnetic-controlled contacts mechanism 2 of the low arc contactor of the present invention is connected with the multifunctional fault-detecting circuit 4, it can detect various faults in AC power source load circuit, such as faulty signals of short circuit, overload, leakage current, phase loss and imbalanced power etc., namely the short circuit current pulse signal or the overload current pulse signal; these signals are fed into the low arc trigger generating circuit 3 as an off-command or signal whereby generating an offstate trigger signal for actuating the coil L2 to generate a pulse magnetic field and disengage the contacts. Thus, the present invention provides with a multifunctional low arc AC contactor.

Referring now to FIG. 4, the multifunctional fault-detecting circuit 4 of the present invention includes a multifunctional fault-detecting unit 41, a short circuit current pulse detecting unit 42, and a short circuit coordinate signal generating unit 43 to form a circuit successively, whereby transmitting short circuit pulse to the off-command detecting unit 36 through the OR gate diode D203. Furthermore, an overload current pulse detecting unit 44 is connected to the multifunctional fault-detecting unit 41 for sending the overload current pulse signal to the photoelectric coupling off-command input unit 35 to provide a offstate trigger pulse. Thus, a pulse magnetic field is generated in coil L2 to disengage the contacts in order to cut out the AC power source load circuit. In an embodiment as shown in FIG. 7, the multifunctional fault-detecting unit 41 consists of plurality of mutual inductors, while the short circuit current pulse detecting unit 42 and the overload current pulse detecting unit 44 consist of voltage comparators made of operational amplifiers OA11, OA12 respectively, wherein the patented circuit disclosed in Chinese Patent No. 95115982.8, and U.S. Pat. No. 6,163,444 has been permitted using in the present invention.

The design principle of short circuit coordinate signal generating unit is as follows:

In accordance with practical situation, the first short circuit signal is not taken into account since it can exist at any position of the AC source. When the second short signal appears, it can be sure that the signal voltage is generated in the process of the AC voltage rising from low to high.

When the AC power source has a short circuit fault, the OA11, in the short circuit current pulse detecting unit 41 will output a high potential pulse signal, at one end of which a capacitor C402 is charged, and at another end of which it is transmitted to OA7 through the resistor R14 and OR gate diode D203. Since OA10 remains unchanged without being affected by the charging of C402, the output of OA10 is still in low potential; therefore, the signal voltage is short circuit to ground through R14 to diode D401. When the OA11 outputs pulse signal changing from high to low, C402 discharges to change the output status of OA10 and OA11 outputs a high potential to charge C401 maintaining the output status of OA10 for a certain period. When the second short circuit signal pulse is generated, it instantly triggers OA7 through R14 and D203 and, then sends through the operational amplifiers OA8, OA9 in the off-command trigger unit 37, and D14 to the trigger switching diode CR3.

Figure 8:
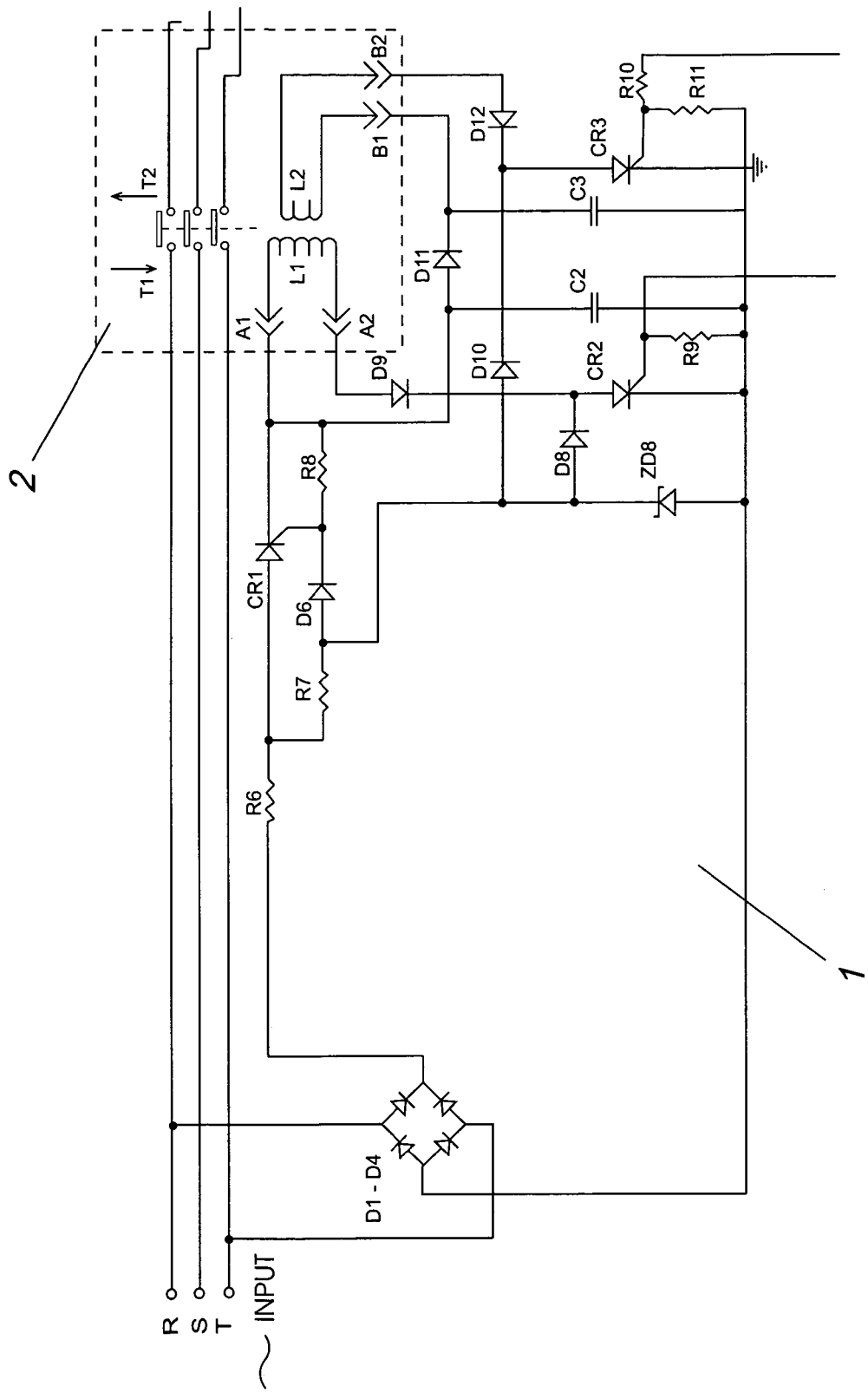
FIG. 8 is another embodiment of the mechanism for engaging/disengaging the electromagnetic-controlled contacts of the present invention.

Referring now to FIG. 8, as an alternative of above mentioned embodiment, the electromagnetic-controlled contacts on/off mechanism 2 of the contactor utilizes a polarized magnetic field self-locking structure. When a pulse current flows through the coil L1, an instantaneous strong magnetic field is induced to polarize a magnetic core, thus attracting the mechanical portion of the contacts to be engaged. Such a situation will be maintained until a pulse current flow through the coil L2, thus inducing an instantaneous strong counter magnetic field and counteracting the magnetic force. Thus, the contacts are disengaged. Such mechanism has the following advantages:

1. The coils L1, L2 have no current consumption except that the pulse current flows there through during startup, and 2. The pulse current at start-up of the coils L1, L2 is ten times higher than the operating current of the conventional contactor.

What is claimed is:

1. A low arc AC contactor comprising an on/off mechanism (2) of electromagnetic-controlled contacts having coils L1, L2 for converting electric energy into magnetic energy, whereby allowing the contacts to be in engaging or disengaging condition, characterized in that, said contactor further comprises:

a pulse power source generating circuit (1) in which its input is connected to R and T terminals for providing two pulse power sources, and both are controllably connected to coil L1 and coil L2 respectively, and a low arc trigger generating circuit (3) in which a pulse DC voltage signal generated by said pulse power source generating circuit (1) is received in order to establish a time coordinate signal of the lowest potential in an AC power source cycle, and an external trigger on/off controlling command is received to provide with on-command trigger pulse to said pulse power source generating circuit (1) so that a strong pulse magnetic field is generated in coil L1, thus resulting in the contacts being in engaging condition, as well as to provide with off-command trigger pulse or an power outage auto-cutout trigger pulse to said pulse power source generating circuit (1) so that a strong pulse magnetic field is generated in coil L2, thus resulting in the contacts being in disengaging condition.

2. The low arc AC contactor according to claim 1, characterized in that said contactor further comprises a multifunctional fault-detecting circuit (4), which is connected to the on/off mechanism (2) of electromagnetic-controlled contacts, and by which a short circuit current pulse detecting signal or an overload current pulse detecting signal is transmitted to the low arc trigger generating circuit (3) in order to output an off-command trigger pulse, thus generating a strong pulse magnetic field in coil L2 and allowing the contacts to be in disengaging condition.

3. The low arc AC contactor according to claim 2, characterized in that the pulse power source generating circuit (1) comprises a pulse DC voltage generating unit (10), a charging switch unit (11), a pulse power storage unit (12) for onstate, and a pulse power storage unit (13) for offstate to form a charging loop successively as well as an onstate discharging switch unit (14) and an offstate discharging switch unit (15) connected to the pulse power storage unit (12) for onstate and the pulse power storage unit (13) for offstate to form a discharging loop by electrically connects to coil L1 or coil L2 respectively.

4. The low arc AC contactor according to claim 2, characterized in that the low arc trigger generating circuit (3) comprises:

an zero potential coordinate signal generating unit (30), by which a pulse DC voltage signal from said pulse power source generating circuit (1) is received and to which a power outage auto-cutout trigger unit (31) is connected;

a photoelectric coupling on-command input unit (32), a on-command detecting unit (33) and a on-command trigger unit (34) to form a circuit successively and in which the on-command detecting unit (33) is also controlled by a time coordinate signal of the lowest potential in an AC power source cycle from zero potential coordinate generating unit (30); and a photoelectric coupling off-command input unit (35), a off-command detecting unit (36) and a off-command trigger unit (37) to form a circuit successively and in which the off-command detecting unit (35) is also controlled by a time coordinate signal of a lowest potential in an AC power source cycle from zero potential coordinates generating unit (30).

5. The low arc AC contactor according to claim 4, characterized in that the photoelectric coupling on-command input unit (32) comprises a photoelectric coupling circuit PT1 by which the ground terminal controlling the on-command operating circuit (32, 33, 34) is isolated from the ground terminal of said contactor.

6. The low arc AC contactor according to claim 5, characterized in that said on-command operating circuit (32, 33, 34) comprising a command key S1 is connected to the input of the photoelectric coupling circuit PT1.

7. The low arc AC contactor according to claim 4, characterized in that said photoelectric coupling off-command input unit (35) comprises a photoelectric coupling circuit PT2 by which the ground terminal controlling the off-command operating circuit (35,36,37) is isolated from the ground terminal of said contactor.

8. The low arc AC contactor according to claim 7, characterized in that said off-command operating circuit (35,36,37) comprising a command key S2 is connected to the input of the photoelectric coupling circuit PT2.

9. The low arc AC contactor according to claim 2, characterized in that the multifunctional fault-detecting circuit (4) comprises a multifunctional fault-detecting unit (41), a short circuit current pulse detecting unit (42), and a short circuit signal coordinates generating unit (43), as well as an overload current pulse detecting unit (44) connected to the multifunctional fault-detecting unit (41) to form the circuit successively and in which the short circuit signal coordinate generating unit (43) and overload current pulse detecting unit (44) are utilized to input off-command signal to said low arc trigger generating circuit (3).

10. The low arc AC contactor according to claim 9, characterized in that said multifunctional fault-detecting unit (41) is a detecting device, which consists of plurality of mutual inductors, and can detect circuit faults: short circuit, overload, leakage current, phase loss and imbalanced power.

11. The low arc AC contactor according to claim 1, characterized in that the said on/off mechanism (2) of electromagnetic-controlled contacts is a self-locking one.

12. The low arc AC contactor according to claim 2, characterized in that the said on/off mechanism (2) of electromagnetic-controlled contacts is a self-locking one.

13. The low arc AC contactor according to any one of claim 1, characterized in that said on/off mechanism (2) of electromagnetic-controlled contacts is a polarized magnetic field self-locking one.

14. The low arc AC contactor according to any one of claim 2, characterized in that said on/off mechanism (2) of electromagnetic-controlled contacts is a polarized magnetic field self-locking one.

* * * * *